(12) United States Patent
Cross

(10) Patent No.: US 12,330,599 B2
(45) Date of Patent: Jun. 17, 2025

(54) SENSOR LENS CLEANING SYSTEM

(71) Applicant: ALPS ALPINE CO., LTD., Tokyo (JP)

(72) Inventor: Christopher Cross, Livonia, MI (US)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/365,931

(22) Filed: Aug. 4, 2023

(65) Prior Publication Data

US 2025/0042368 A1     Feb. 6, 2025

(51) Int. Cl.
    *B60S 1/56*         (2006.01)
    *B60S 1/08*         (2006.01)
    *B60S 1/48*         (2006.01)
    *B60S 1/50*         (2006.01)

(52) U.S. Cl.
    CPC . *B60S 1/56* (2013.01); *B60S 1/08* (2013.01); *B60S 1/481* (2013.01); *B60S 1/487* (2013.01); *B60S 1/50* (2013.01)

(58) Field of Classification Search
    CPC .... B60S 1/56; B60S 1/08; B60S 1/481; B60S 1/487; B60S 1/50
    See application file for complete search history.

(56) References Cited

U.S. PATENT DOCUMENTS

| | | | |
|---|---|---|---|
| 10,589,726 B1 * | 3/2020 | Ingram | B60S 1/28 |
| 10,606,151 B1 | 3/2020 | Esterholt et al. | |
| 11,305,733 B2 | 4/2022 | Herrmann et al. | |
| 2008/0170844 A1 | 7/2008 | Samuel | |
| 2017/0313288 A1 | 11/2017 | Tippy et al. | |
| 2018/0009418 A1 | 1/2018 | Newman | |
| 2020/0296273 A1 * | 9/2020 | Staab | H04N 23/71 |

FOREIGN PATENT DOCUMENTS

| | | | | |
|---|---|---|---|---|
| WO | WO-2021040517 A1 * | 3/2021 | | B60S 1/08 |
| WO | WO-2021080430 A1 * | 4/2021 | | B60S 1/0477 |

* cited by examiner

*Primary Examiner* — Sharidan Carrillo
(74) *Attorney, Agent, or Firm* — Knobbe, Martens, Olson & Bear, LLP

(57) ABSTRACT

Sensor cleaning systems are disclosed for cleaning an entrance surface through which light beams are transmitted from an environment to a vehicle-mounted sensor. The sensor cleaning system includes multiple washing elements that dispense a heated or non-heated washer fluid over the entrance surface from different angles, and multiple wiping elements that move independently over the entrance surface. The washing and dispensing elements wash and wipe the entrance surface in a sequence of reconfigurable wiping and washing steps. During vehicle shut down and startup processes, the sensor cleaning system automatically performs a cleaning process. After a last cleaning process performed during a vehicle shut down process, the wiping elements cover the entrance surface to shield the entrance surface from dirt and other debris that could interfere with sensor operation.

12 Claims, 9 Drawing Sheets

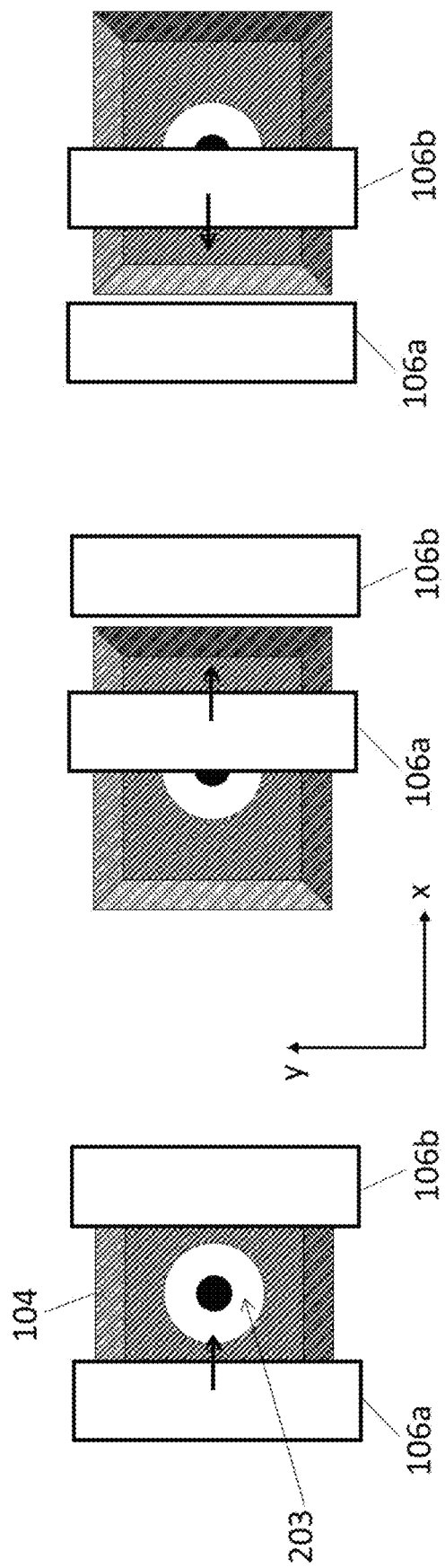

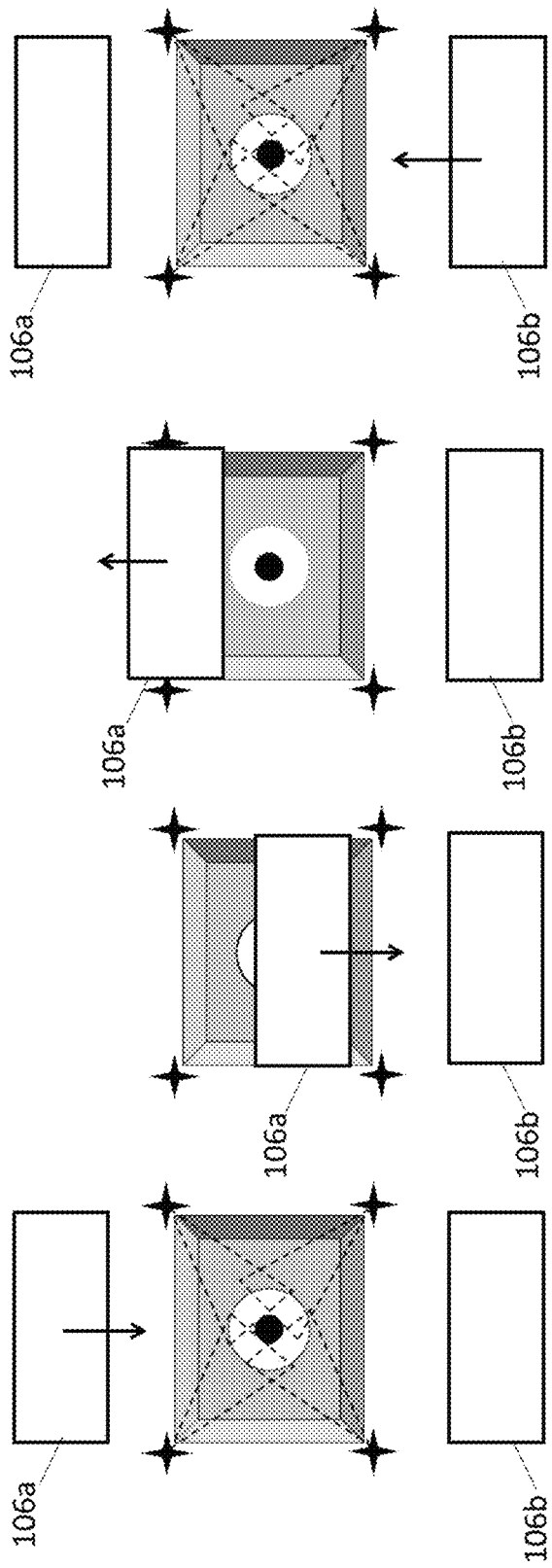

SENSOR LENS CLEANING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

Various embodiments of this application relate to the field of sensor protection and cleaning systems and to sensor cleaning systems for cleaning vehicle-mounted sensors.

Description of Related Art

Vehicle-mounted sensors are typically exposed to a variety of environmental conditions that can degrade their performance. More specifically, an entrance opening, entrance window, or entrance surface of an electromagnetic sensor (e.g., a camera, an imaging system, a range finder, such as laser range finder, or the like), can be partially blocked, become less transparent, or cause electromagnetic scattering, when it is exposed to contaminants, low temperatures (e.g., due to formation of ice particles), rain, and the like. A sensor cleaning system can maintain the transparency of the entrance opening, entrance window, and/or the entrance surface of the electromagnetic sensor, by periodically removing the contaminants on the opening, window, or entrance surface. As such there is a need for improving the efficiency of these sensor cleaning systems to maintain a sufficiently large portion of the surface of the opening or window clean for an extended period, especially in harsh environmental conditions.

SUMMARY

Sensor cleaning systems are disclosed for cleaning an entrance surface through which light beams are transmitted from an environment to a vehicle-mounted sensor. The sensor cleaning system includes multiple washing elements that dispense a heated or non-heated washer fluid over the entrance surface from different angles, and multiple wiping elements that move independently over the entrance surface. The washing and dispensing elements wash and wipe the entrance surface in a sequence of reconfigurable wiping and washing steps. During vehicle shut down and startup processes, the sensor cleaning system automatically performs a cleaning process. After a last cleaning process performed during a vehicle shut down process, the wiping elements cover the entrance surface to shield the entrance surface from dirt and other debris that could interfere with sensor operation.

In some aspects, the techniques described herein relate to a sensor cleaning system including: a sensor housing that houses a sensor and includes an opening which allows electromagnetic radiation (e.g., light) to be transmitted from an environment to a cavity of the sensor housing and reach a sensing element of the sensor via an entrance surface; at least one wiping element coupled to the sensor housing and configured to wipe the entrance surface; a first washing element and a second washing element positioned to dispense a fluid on the entrance surface along a first direction and a second direction different from the first direction, the first and second washing elements configured to receive the fluid from a fluid reservoir; and a motor coupled to the at least one wiping element, the motor configured to move the at least one wiping element in response to a control signal received from a controller; wherein the controller is configured to control the motor to activate the at least one wiping element and control a fluid pump to dispense the fluid through the first and second washing elements, in a predetermined sequence; and wherein the fluid pump is in communication with the fluid reservoir and the first and second washing elements.

In some aspects, the techniques described herein relate to a sensor cleaning system including: a sensor housing that houses a sensor and includes an opening which allows electromagnetic radiation to be transmitted from an environment to a cavity of the sensor housing and reach a sensing element of the sensor via an entrance surface; a first wiping element coupled to the sensor housing; a second wiping element coupled to the sensor housing; and a motor coupled to the first and second wiping element, the motor configured to move the first and the second wiping element in response to control signals received from a controller; wherein the controller is configured to control the motor to move the first wiping element along a first wiping path and the second wiping element along a second wiping path in a predetermined sequence in response to a control signal received from the controller; and wherein the first wiping path different from the second wiping path.

In some aspects, the techniques described herein relate to a method of cleaning an entrance surface through which electromagnetic radiation is received by a sensing element of a sensor from an environment, the method including, by a control system of a cleaning system: dispensing a fluid on the entrance surface via at least two washing elements and along at least two different directions; moving a first wiping element over the entrance surface from a first position along a first wiping path; and moving a second wiping element over the entrance surface from a second position along a second wiping path; wherein the first wiping path is different from the second wiping path.

BRIEF DESCRIPTION OF THE DRAWINGS

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

FIGS. 4A-4C are schematic diagrams illustrating a front view of a sensor cleaning system, having wimping elements that move in a horizontal direction, when the left wiping element is moving toward the entrance surface of the sensor or sensor housing (A), when the left wiping element slides over the entrance surface (B), and when the right wiping element slides over the entrance surface.

FIGS. 7A-7I are schematic diagrams illustrating sequential steps of a cleaning cycle performed by the sensor cleaning system shown in FIG. 2A, based on the process shown in FIG. 6.

DETAILED DESCRIPTION

Figure 1:
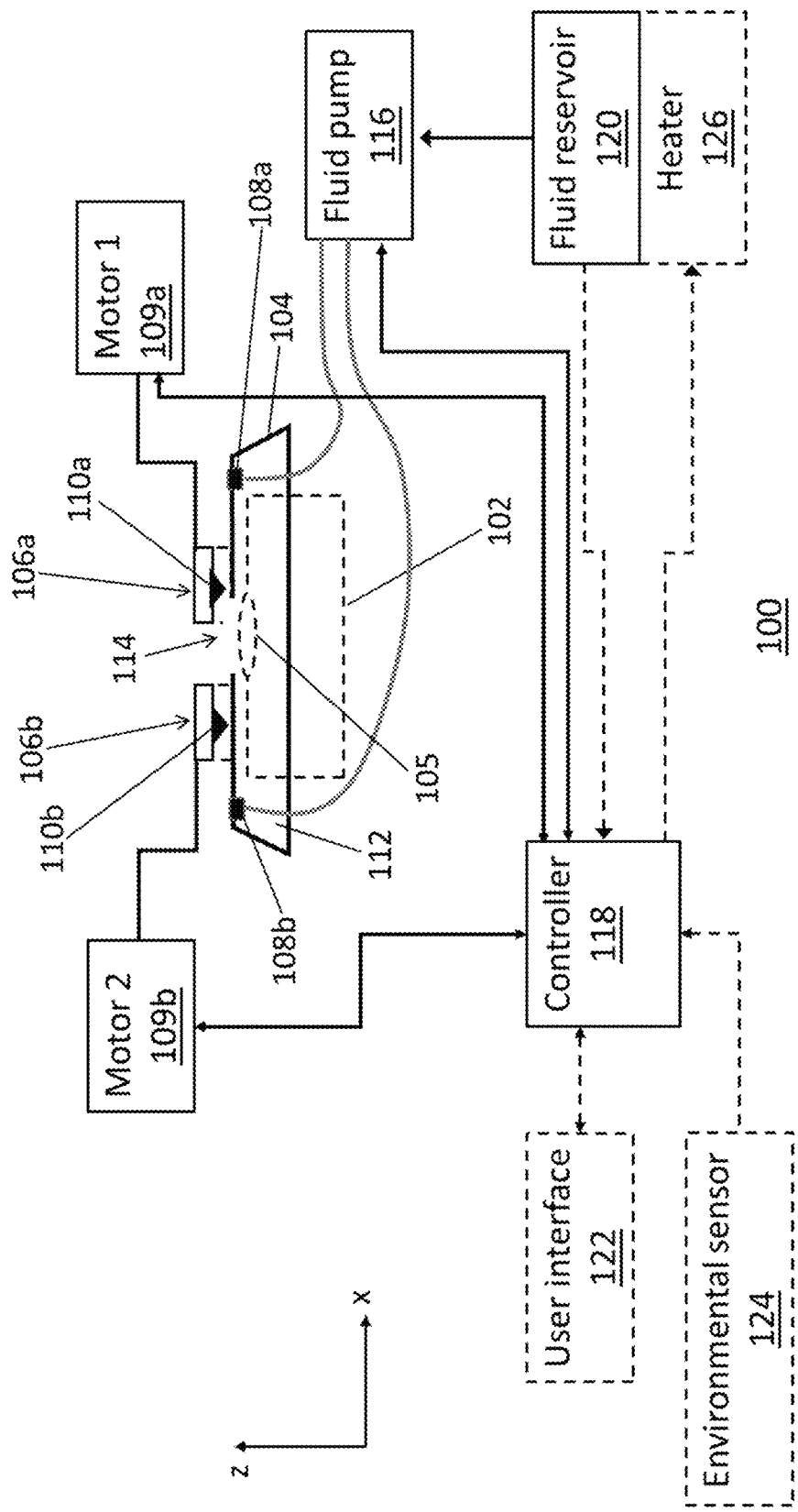
FIG. 1 is a block diagram illustrating an example sensor cleaning system.

Modern vehicles use a variety sensor for navigation, safety, and generally monitoring an environment surrounding the vehicle. Examples of vehicle-mounted sensors include but are not limited to view cameras (e.g., a front, a side, a rear, or a 360-degree camera), and sensors (e.g., laser detection and range finders) used in lane departure assistance systems, blind alert systems, auto-pilot or autonomous driving systems, and the like. Majority of these sensors use different forms of electromagnetic (EM) waves received from a surrounding environment (or scene) to monitor the environment, generate an image of a scene, or determine distances from objects in the environment or scene. EM waves received by a sensor may include Radio frequency (RF), microwave signals, mm-Wave signals, terahertz signals, optical signals, or light beams and rays having wavelengths in different ranges. In various implementations, the frequency of RF signals can be from 1 kHz to 1000 MHz, the frequency of microwave signals can be from 1 GHz to 30 GHz, the frequency of mm-wave can be from 30 GHz to 500 GHz, the frequency of terahertz signals can be from 0.5 THz to 20 THz, and the wavelength of optical signals or light beam can be from 0.3 micrometers to 1 micrometers, from 1 micrometers to 2 micrometers, from 2 micrometers to 3 micrometers or larger values.

These types of sensors, which may be collectively referred to as EM sensors, can receive EM waves from an environment or a scene through an entrance surface. An entrance surface can be a surface of a window, a lens, or components (e.g., other optical components), through which EM waves are transmitted to a sensing element of the sensor (e.g., a charge coupled device (CCD), an array of antennas, an array of photodetectors, or any surface and/or structure that may convert the received electromagnetic waves to currents or voltages). In some cases, EM waves pass through one or more interfaces before becoming incident on the sensing element of the sensor that generates an electric signal in response to receiving the EM waves. For example, the sensing element can be an image sensor of a camera that receives light rays from an environment via one or more optically transparent elements (e.g., windows, lenses, and the like). The one or more optically transparent elements may be configured to transform the received light rays and project an image on the sensor element. In some cases, one optically transparent element (e.g., a window) may be configured to isolate the image sensor or the other optically transparent elements from the environment. In various implementations, a first surface (or interface) through which EM waves enter a sensor system, or housing that contains the sensor system, may be referred to as the entrance surface of the sensor system. In some cases, the entrance surface can be a surface of a protecting window (e.g., a window of housing) that isolates the sensor from the environment.

The entrance surface may be exposed to a variety of environmental conditions (e.g., contaminants, dust, low temperature, rain, snow, humidity, ice, and the like), resulting in deposition and buildup of contaminants (e.g., dust particles, water droplets, and the like) that can increase absorption and/or scattering of EM waves passing through the entrance surface. For example, when an entrance surface of a camera (e.g., outer surface of a lens or a window) is contaminated, less light may be transmitted to image sensor and the transmitted light may be scattered resulting in formation of a blur, fuzzy, and/or low intensity images on the image sensor. To address this issue, a sensor cleaning system may be integrated with or mounted on the sensor to keep the entrance surface to the sensor (e.g., an EM sensor) clean. In some cases, the sensor cleaning system may comprise a window (e.g., a transparent window) that isolates the sensor from the environment, and a mechanism to keep an outer surface of the window (the entrance surface to the sensor) clean and transparent. In these cases, the entrance surface may comprise the window of the cleaning system. A sensor cleaning system may remove contaminants from the entrance surface, periodically or upon receiving a trigger signal generated by control system or a user (e.g., the driver of the vehicle that carries the sensor).

Some of the conventional sensor cleaning systems lack certain features that can help cleaning and/or wiping the entrance surface of a sensor efficiently. For example, some of the conventional sensor cleaning systems use only a single wiping element to clean the entrance surface. Cleaning the entrance surface with one wiping element can cause accumulation of debris build up in certain portions (e.g., corners and edges) of the entrance surface. For example, when sensor cleaning system can only wipe/clean the surface by moving a single wiping element in one direction debris may buildup in an edge of corner where the motion of the wiping element ends. While the single wiping element may have multiple wiping blades, when all the wiping blades move together, still debris may buildup in an edge of that corner.

In some cases, the conventional sensor cleaning systems do not use washer fluid to clean the entrance surface. In some cases, the conventional sensor cleaning systems may not use heated washer fluid to clean the entrance surface. As such there is a need to include additional features (e.g., washer fluid dispensers, heating elements, and multiple wiping elements) in sensor cleaning systems to improve their efficacy for maintaining a sufficiently large portion of the entrance surface clean for an extended period in particular under harsh environmental conditions.

Some of the sensor cleaning systems and methods described here may significantly improve the results of an entrance surface cleaning process, e.g., using at least two wiping elements that can move independently and in multiple directions over the entrance surface, and/or by dispensing a washer fluid on the entrance surface before and/or during wiping/cleaning process. In some cases, the two wiping elements may form an eyelid-like device, where the two wiping elements can move together or separately in the same or opposite directions. Advantageously, cleaning or wiping an entrance surface by independently moving two or more wiping elements over the entrance surface may remove debris more efficiently and prevent derbies build up. In some cases, moving the wiping elements along multiple directions may remove derbies more efficiently and prevent buildup of debris.

In some cases, the sensor cleaning system may comprise two or more fluid dispenser points (herein referred to as washing elements) that dispense the washer fluid in different directions over the entrance surface to cover at least a portion and/or the entire surface with washer fluid. For example, the sensor cleaning system may include four washing elements positioned (e.g., symmetrically and/or asymmetrically) at four corners of an entrance surface where each washing element dispenses the washer fluid over a 90-degree angle from each corner.

Additionally, in some embodiments, the washer fluid can be selectively heated to facilitate removal of certain derbies and build ups (e.g., ice) from the entrance surface. In some cases, a temperature of the washer fluid may be controlled by a user or based on at least a sensor signal indicative of an environmental condition (e.g., temperature).

These and other features described below may significantly improve the performance of the sensor cleaning system and maintain the entrance surface of a sensor (e.g., a camera or a range finding system such as light/laser detection and ranging system) clean and highly transparent. The performance of various systems used in modern vehicles (e.g., cameras, Laser range finders, Blind spot assistance, Lane Assistance, Auto-Pilot systems, obstacle detection system, security systems, and the like), may be improved as a result of having a clean and transparent entrance surface for sending and receiving EM waves (e.g., light beams).

Employing the sensor cleaning system having one or more of the features mentioned above, and described with more details below, may decrease sensor malfunctions associated with a dirty or completely blocked (e.g., with ice, dust, mud, or packed snow) entrance surface.

In some embodiments, the wiping elements may be configured to protect the entrance surface when the sensor is not in use (e.g., when the vehicle is parked). For example, in eyelid like design, two wiping elements may cover substantially the entire entrance surface when they are in contact (e.g., when the wiping elements are in closed state). In some examples, in a closed state the wiping elements may isolate the entrance surface from the surrounding environment and thereby protect the entrance surface from contamination when the sensor is not in use. In these embodiments, the sensor cleaning system may serve a dual role as an entrance surface cleaner and a shutter that blocks, isolates, or protects the entrance surface, e.g., when the vehicle is parked or when the sensor is not used for other reasons. In some examples, the shutter function may be automated such that when the vehicle is turned off the two wiping elements automatically come together and block the entrance surface. In some cases, shutting down the vehicle may trigger a last cleaning cycle before blocking the entrance surface to ensure the entrance surface is clean and ready to use when the vehicle is restarted. In some embodiments, when the vehicle is restarted (manually or auto-started), the sensor cleaning system may automatically perform an initial cleaning cycle and remain open (keep the wiping elements away from the entrance surface) to allow the sensor to send and/or receive EM waves via the entrance surface.

Sensor Cleaning System with Multiple Wiping Elements and Fluid Dispensers

In some cases, a sensor cleaning system includes a sensor housing, at least two wiping elements that can move independently over an entrance surface through which electromagnetic waves can enter a cavity of the housing and/or the sensor, and at least one washing element configured to provide a washer fluid over the surface. In various implementations, the entrance surface may comprise a surface of a lens or a window of the sensor or the sensor housing. In some cases, the window may be disposed within an opening of the sensor housing. In some cases, the sensor may comprise the window or the lens.

FIG. 1 is a block diagram illustrating a sensor cleaning system 100 (also referred to as cleaning system 100) configured to clean an entrance surface (e.g., surface of a lens or a window) through which electromagnetic waves (e.g., light) enter the sensor 102. In some cases, the sensor 102 can be placed, at least partially, within a cavity 112 of a sensor housing 104 of the sensor cleaning system 100. In some cases, the sensor cleaning system 100 comprises the sensor housing 104, at least two wiping elements 106a, 106b, at least two motors 109a, 109b, at least one controller 118, and a fluid dispensing system (also referred to as dispensing system) configured to dispense fluid (e.g., a washer fluid) over the entrance surface. The fluid dispensing system may comprise, two or more washing elements 108a/108b, at least one fluid pump 116, at least one fluid reservoir 120 connected to the washing elements 108a/108b via the at least one fluid pump 116 and two or more fluid lines. The sensor housing 104 may comprise an opening 114 though which electromagnetic waves can be transmitted from an environment monitored by the sensor 102, to the cavity 112 of the sensor housing 104 and a sensing element of the sensor 102. In some cases, the opening 114 may comprise the entrance surface. The sensing element of the sensor 102 (e.g., a charge coupled device (CCD) array, a focal plane array, an array of single photon avalanche photodiodes (SPADs), an antenna, and the like) may be configured to generate one or more electric signal in response to receiving the electromagnetic waves. The controller 118 may be in communication with the motors 109a/109b, the fluid pump 116, the fluid reservoir, and a heater 126 via wired or wireless connections. In some embodiments, motor 109a and/or the motor 109b may comprise an electric motor (e.g., a DC motor, AC motor, a stepper motor, a brushless motor, or other types of motors). In various implementations, the electromagnetic waves may comprise visible (VIS) light or infrared (IR) light (e.g., near IR or mid IR light). In some examples, the sensor 102 can be a sensor (e.g., a CCD sensor or a focal plane array) of a camera (e.g., a digital camera), a sensor of laser/light detection and ranging system (lidar), a sensor of a radio detection and ranging (RADAR) system, a sensor of an imaging system, or a sensor of any other system that operates by receiving electromagnetic waves from an environment. In some cases, the sensor 102 may comprise one or more sensors receiving electromagnetic waves (e.g., light) from a common aperture (e.g., the opening 114 and/or via a common entrance surface). In various examples, the electromagnetic waves may comprise light having wavelengths from 400 nm to 700 nm, from 700 nm to 1100 nm, from 1100 nm to 1700 nm, from 1700 nm to 3000 nm or larger wavelengths.

In some cases, the entrance surface may comprise a surface of the sensor housing 104 through which electromagnetic waves (e.g., light) are transmitted from the environment to the sensor. For example, the entrance surface may comprise a surface of a window disposed in the opening 114 of the sensor housing 104. In some cases, the entrance surface may comprise a surface of a lens 105 of the sensor 102 that receives electromagnetic waves through the opening 114 of the sensor housing. In some implementations, the opening 114 may comprise a lens disposed in the opening 114 through which the electromagnetic waves are transmitted from the environment to the lens 105 or a window of the sensor 102.

In some embodiments, the first motor 109a is operatively coupled (e.g., mechanically coupled) to the first wiping element 106a and the second motor 109b is operatively coupled (e.g., mechanically coupled) to the second wiping element 106a. In some implementations, the first and the second wiping elements 106a/106b may be movably coupled to the sensor housing 104. For example, the first and the second wiping elements 106a/106b may be configured to slide or move with respect to the sensor housing 104 and over the entrance surface while being mechanically coupled to the sensor housing 104 (e.g., via a guide rail). The first and the second motors 109a, 109b can be configured to independently move the first and the second wiping elements 106a, 106b with respect to the sensor housing 104 and over the entrance surface of the sensor 102 of the sensor housing 104. In some examples, the first and the second motors 109a, 109b, may be configured to move the first and the second wiping elements 106a, 106b along the same or opposite directions during different steps of a cleaning cycle. In some cases, a single motor may be used to the first and second wiping elements 106a, 106b (e.g., sequentially).

In some embodiments, each wiping element 106a/106b comprises a wiping blade 110a/110b configured to move away contaminants, e.g., from a center region to an edge region of the entrance surface, as one or both wiping element 106a and 106b move or slide over the entrance surface. In some cases, the wiping blade 110a (or 110b) may comprise at least one contact edge configured to stay in touch with the entrance surface at least during a portion of a cleaning cycle to clean and/or wipe the entrance surface. For example, the motors 109a and/or 109b may be configured to slide the elements 106a/106b along one or more guide rails such that when they pass over the entrance surface, the wiping edges of the wiping blades 110a/110b wipes the entrance surface. In some embodiments, at least one wiping element of the wiping elements 106a/106 may comprise a sliding element connected or coupled to the wiping blade. In some cases, the sliding element may be movably coupled to the sensor housing 104, e.g., via a guide rail. In some cases, the wiping blade can be removably connected or coupled to the sliding element to allow replacing the wiping blade.

In some cases, the washing elements 108a, 108b may be disposed (e.g., mechanically mounted or connected) to the sensor housing 104 and configured to spray a fluid (e.g., water or a washer fluid) received from a fluid reservoir, over the entrance surface. For example, the washing elements 108a or 108b each may comprise a nozzle. In some examples, a first washing element 108a may spray the fluid along a first direction and the second washing element 108b may spray the fluid along a second direction. In some cases, first direction can be different from the second direction. In some examples, the first washing element 108a (or the second washing element 108b) may generate a divergent or flared fluid stream centered at or around the first direction (or the second direction).

Additionally, in some cases, the sensor cleaning system 100 may include a third washing element, configured to spray the fluid along a third direction. The third direction can be different from the first and/or the second directions. Additionally, in some cases, the sensor cleaning system 100 may include a fourth washing element configured to spray the fluid along a fourth direction. The fourth direction can be different from the first, second, and/or the third directions. In some examples, angles between the first and the second direction, between the second and the third directions, and/or between the third and fourth directions can be substantially equal (e.g., 90 degrees, 60 degrees, 180 degrees). In yet other cases, the cleaning system 100 may include more than four washing elements distributed around an entrance surface. In some cases, an angle between any two directions along which the fluid is sprayed can be from 1 to 10 degrees, from 10 to 30 degrees, from 30 to 50 degrees, from 50 to 70 degrees, from 70 to 90 degrees, from 90 to 110 degrees, from 110 to 130 degrees, from 130 to 150 degrees, from 150 to 170 degrees, from 170 to 180 degrees, or any range formed by these values. Advantageously, using two or more washing elements allows spraying the fluid over the entrance surface along two or more different directions and thereby spreading the fluid over a larger portion of the entrance surface compared to a cleaning system that uses one or fewer washing elements.

In some cases, the fluid pump 116 (also referred to as pump) may receive the fluid from a fluid reservoir 120 and provide a fluid stream to the washing elements 106a/106b, and possibly to additional washing elements of the cleaning system 100, via one or more tubes. In some cases, a washing element may comprise a nozzle configured to receive a fluid stream (e.g., a pressurized fluid stream) from the pump 116 and spray the fluid over the entrance surface. In various implementations, the fluid pump 116 may comprise an electrical fluid pump.

In some implementations, the cleaning system 100 may comprise a heater or heating element 126 thermally coupled to the fluid reservoir 120 and configured to provide heat to the fluid reservoir 120 and increase the temperature of the fluid.

In various implementations, the motors 109a/109b, the pump 116, and the heater (or heating element) 126 may be controlled by the controller 118 using a wired or wireless connection.

In some embodiments, the controller 118 comprises an electronic circuitry that controls the motors 109a/109b (or additional motors), the pump 116 (or any additional pump), and the heater 126 (or any additional heater), e.g., by providing electronic control signals (herein referred to as control signals). In some examples, the controller 118 may comprise a processor that executes machine readable instructions stored in a non-transitory memory of the controller 118 or another system, to control the operation of the cleaning system 100.

In some cases, the controller 118 may be in communication (wired or wireless) with a user interface 122 through which a user can provide commands to control an operation of the cleaning system 100 or check a status of the cleaning system 100. For example, the user may use the user interface 122 to adjust parameters of a cleaning cycle (e.g., speed, washing pattern, duration, and the like), a temperature of the fluid stored in the fluid reservoir 120, a cleaning period, a final state of the wiping elements 106a, 106b at the end of a cleaning cycle, and the like. In various implementations, the user interface 122 may comprise a display (e.g., a touch sensitive display), a keypad, a control button, and the like. In some cases, the user interface can be a user interface of a vehicle on which the sensor 102 and the sensor cleaning system 100 are mounted.

In some cases, the controller 118 may receive a sensor signal from an environmental sensor 124 configured to monitor one or more parameters (e.g., humidity, temperature, particle count, and the like) of an environment surrounding the vehicle. The controller 118 may process the sensor signal to determine whether the cleaning system has to be activated or not, and if it has to be activated, what type and how many cleaning cycles should be performed. In some cases, the controller 118 may use the sensor signal to determine a target temperature of the cleaning fluid and send a control signal to the heater 126 to increase the temperature of the heating fluid in the fluid reservoir 120 to the determined target temperature. In some embodiments, the heater 126 may be in thermal communication with the fluid reservoir 120 and increase the temperature of the washer fluid by providing thermal energy to the fluid reservoir 120. In some other embodiments, the heater 126 may be configured to directly provide thermal energy to the washer fluid after it leaves the fluid reservoir 120. In some cases, when the vehicle is already equipped with a heated washer fluid function, heated washer fluid may be provided to the fluid pump 116, to the fluid reservoir 120, or directly to the washing elements 108a/108b.

In some embodiments, the fluid reservoir 120 may include a temperature sensor configured to generate a fluid temperature signal indicative of a temperature of the washer fluid inside the fluid reservoir 120. In some such embodiments, the controller 118 may receive the temperature signal from the temperature sensor and adjust the heater 126 based at least in part on the temperature signal.

In some cases, the sensor cleaning system 100 by default may use a non-heated washer fluid and during certain weather conditions (e.g., indicated by the environmental sensor 124) may use heated washer fluid (e.g., by automatically heating the washer fluid before a cleaning cycle).

In some embodiments, the fluid reservoir 120 may include a fluid level sensor configured to generate a fluid level signal indicative of a level of fluid inside the fluid reservoir 120. In some such embodiments, the controller 118 may receive the fluid level signal from the fluid level sensor and present the fluid level to a user (e.g., vehicle driver) via the user interface 122 (e.g., by displaying a symbol indicative of the fluid level on a display of the user interface 122).

In some cases, each wiping element 106a (or 106b) may include at least one wiping blade configured to wipe or clean the entrance surface. In some cases, an edge of the wiping blade may be configured to stay in touch with the entrance surface during a cleaning cycle at least when the wiping element moves over the entrance surface.

In some embodiments, the wiping blades 110a/110b may comprise a natural or synthetic rubber (e.g., polyisoprene, butadiene, ethylene-propylene-diene, neoprene or blends thereof). In some embodiments, the wiping blades 110a/110b may comprise other materials.

In some embodiments, the wiping element 106a/106b may comprise metal or plastic, or materials. In some embodiments, the wiping element 106a/106b may comprise other materials.

In some embodiments, the sensor housing 104 may comprise metal, plastic, or other materials. In some embodiments, the sensor housing 104 may comprise other materials.

In some embodiments, the sensor housing 104 may have width or a length from 5 mm to 5 cm, from 5 cm to 10 cm, from 10 cm to 20 cm, or larger or smaller values.

Figure 2A:
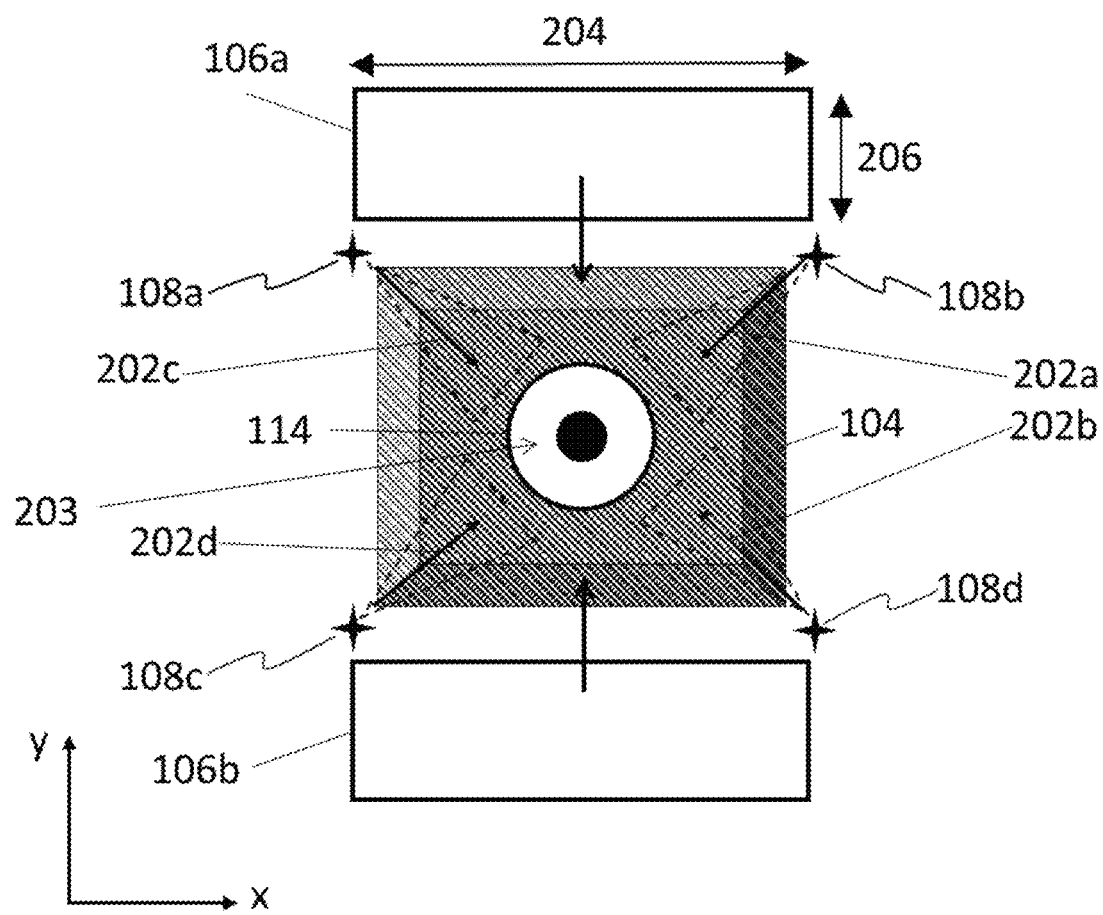
FIG. 2A is a schematic diagram illustrating a front view of a sensor cleaning system, having wimping elements that move in a horizontal direction, in an open state when the top and bottom wiping elements are away from an entrance surface of the sensor or the sensor housing.

FIG. 2A is a schematic diagram illustrating a front view of an example sensor cleaning system having two wiping elements 106a/106b (e.g., top and bottom wiping elements), a sensor housing 104, and four washing elements 108a/108b/108c/108d. In some cases, the sensor cleaning system can be mounted over a rear view or front view camera of a vehicle. In the example shown the sensor housing 104 has a rectangular shape and the four washing elements 108a/108b/108c/108d are be disposed at or near four corners of the sensor housing 104. In some examples, the washing elements 108a/108b/108c/108d may be configured to spray a washer fluid over the entrance surface 203 along four different major dispensing directions 202a/202b/202c/202d. In some cases, a major dispensing direction can be a direction around which the fluid stream is distributed within a dispensing angle. In some cases, the four different major dispensing directions may pass through a center of the entrance surface 203. In some cases, an angle between a major dispensing direction of fluid stream generated by a washing element can be substantially perpendicular to a major direction of fluid stream generated by an adjacent washing element. Other configurations are possible.

In the example shown, the sensor cleaning system is in an open state where the top and bottom wiping elements are away from the entrance surface 203. In some cases, the entrance surface 203 can have a circular shape. In other examples, the entrance surface may have a rectangular, square, oval, or another shape. In some cases, the entrance surface may comprise a portion of the lens 105 exposed through the opening 114 of the sensor housing 104.

Figure 2B:
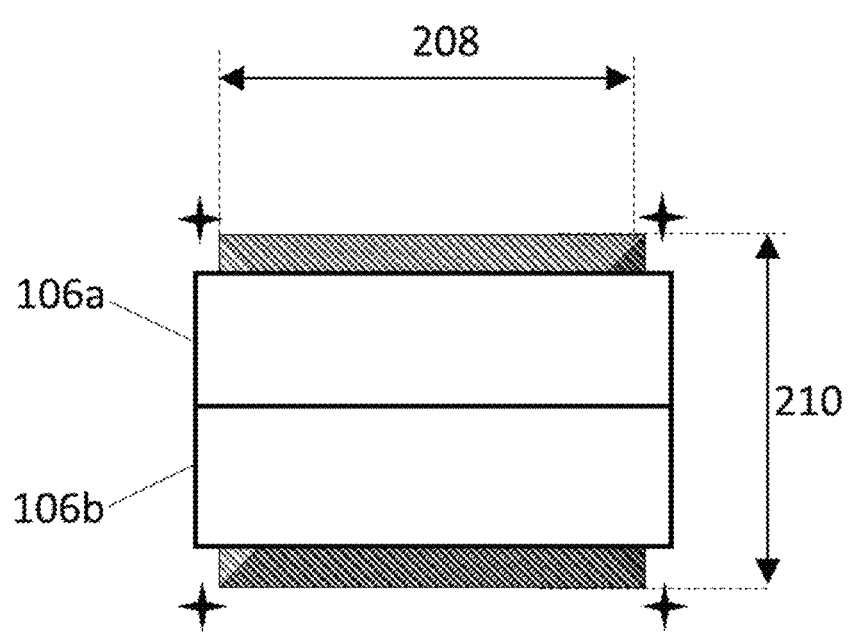
FIG. 2B is a schematic diagram illustrating a front view of the sensor cleaning system shown in FIG. 2A in a closed state when the top and bottom wiping elements cover the entrance surface of the sensor or the sensor housing.

FIG. 2B is a schematic diagram illustrating a front view of the sensor cleaning system shown in FIG. 2A in a closed state where the top and bottom wiping elements 106a/106b are positioned over the entrance surface 203 to protect the entrance surface 203. In the closed state the wiping elements 106a/106b may prevent light (or electromagnetic waves) from entering the cavity 112 of the sensor housing 104 and thereby the sensor 102. In some cases, at the end of a cleaning cycle and/or when the vehicle is turned off, the sensor cleaning system may go to the closed state (shown in FIG. 2B) to keep the entrance surface clean.

Figure 2C:
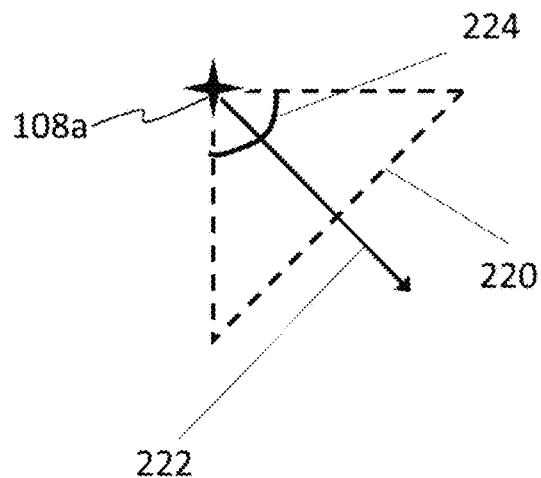
FIG. 2C is a schematic diagram illustrating an example fluid dispensing pattern for a single washing element of the sensor cleaning system 100.
Figure 2D:
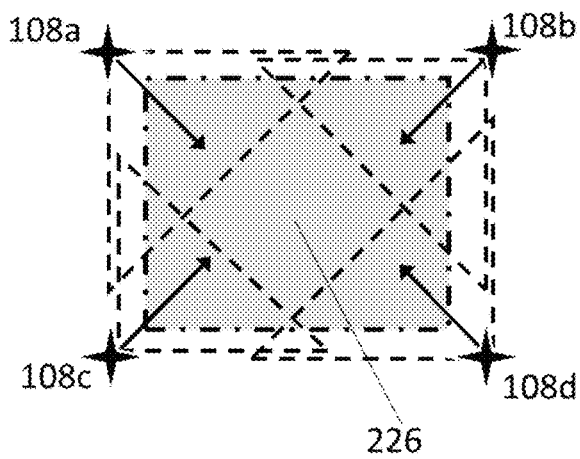
FIG. 2D is a schematic diagram illustrating an example sensor cleaning system having four washing elements where each element has a fluid dispensing pattern having a 90-degree corner angle.
Figure 2E:
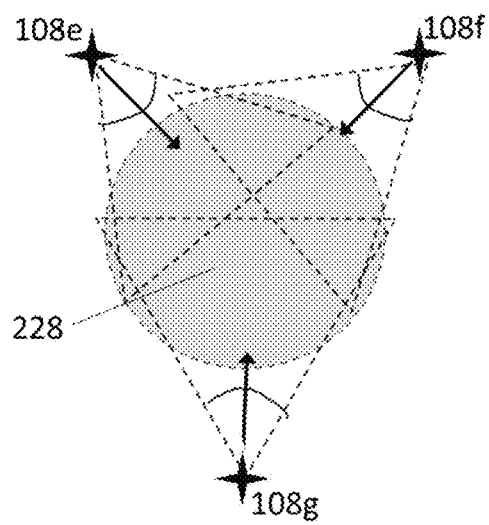
FIG. 2E is a schematic diagram illustrating another example sensor cleaning system having three washing elements for cleaning a circular entrance surface.

FIG. 2C is a schematic diagram illustrating an example fluid dispensing pattern 220 for a single washing element (e.g., washing element 108a) of the sensor cleaning system 100. In some cases, the fluid dispensing pattern 220 may comprise a cone-like diverging stream originated from the washing element 108a and symmetrically distributed around the major dispensing direction 222 within an angular region substantially limited by a divergence angle 224. In some cases, the divergence angle 224 can be adjustable (e.g., manually or by the controller 118). In some cases, the divergence angle 224 can be from 2 to 4 degrees, 4 to 7 degrees, from 7-10 degrees, 10 to 15 degrees, 15 to 20 degrees, or any range formed by these values or larger or smaller values. FIG. 2D is a schematic diagram illustrating an example sensor cleaning system having four washing elements 108a/108b/108c/108d where each washing element has a fluid dispensing pattern having a divergence angle of about 90-degrees. Advantageously, the configuration shown in FIG. 2D can effectively cover the entire surface of a rectangular or square shape entrance surface 226. FIG. 2E is a schematic diagram illustrating another example sensor cleaning system having three washing elements 108e/108f/108g for cleaning a circular entrance surface 228. In some examples, the divergence angle of the fluid dispensing pattern of individual washing elements 108e/108f/108g and their positions with respect to the entrance surface 228 may configured to fully cover the entrance surface 228.

In various implementations, a plurality of washing elements (e.g., nozzles) having similar or different dispensing patterns can be disposed around an entrance surface through which EM waves are transmitted from an environment to a sensor (e.g., a camera, an imaging system, or a lidar). A spatial distribution of washing elements with respect to the entrance surface and the dispensing pattern of each washing element, may be determined based on a shape and size of the entrance surface. In some cases, the plurality of washing elements may simultaneously dispense the washer liquid over the entrance surface during a washing step of a cleaning cycle. In some cases, at least one washing element may dispense the washer liquid before or after other washing elements. In some cases, the controller 118 may include one or more fluid pumps and/or fluid valves, to selectively dispense washer liquid via one or more washing elements of the plurality of washing elements. In some cases, the controller 118 may be programmed or configured to sequentially dispense the washing fluid via different washing elements during a single or multiple washing steps. For example, with reference to FIG. 2D, a washing step may comprise dispensing washer fluid sequentially via the washing elements 108a, 108b, 108c, and 108d. Alternatively, the controller 118 may dispense washer fluid via the washing elements 108a and 108b during a first washing step, and via the washing elements 108c and 108d during a second washing step after the first washing step of a cleaning cycle. In some cases, the cleaning cycle may include a wiping step between the first and second washing step. In various embodiments, the washer liquid may be dispensed based on different sequences in different cleaning cycles. In some cases, the temporal and spatial pattern of washer fluid dispensing over an entrance surface may be controlled by the controller 118 based on user input and sensor signals received from the environmental sensor. For example, when the sensor signal indicates a low temperature condition, the controller 118 may dispense heated washer fluid through a larger number of washing elements and/or for a longer period.

In the example shown, the wiping elements 106a/106b have a rectangular shape, however in other examples, the wiping elements 106a/106b can have other shapes (e.g., square, semi-circular, trapezoidal, and the like). A length 204 of a wiping element (e.g., wiping element 106a or 106b) along a horizontal direction (e.g., parallel to the x-axis) can be from 2 mm to 1 cm, from 1 cm to 5 cm, from 5 cm to 10 cm or larger or smaller values. In some cases, a width 206 of a wiping element (e.g., wiping element 106a or 106b) along a vertical direction (e.g., parallel to the y-axis) can be smaller than the length 204 of the wiping element. In some cases, the width 206 of a wiping element can be from 2 mm to 1 cm, from 1 cm to 5 cm, from 5 cm to 10 cm or larger or smaller values. In FIG. 2A the sensor cleaning system is in an open state where the top wiping element 106a is positioned above the entrance surface 203 and the bottom wiping element 106b is positioned below the entrance surface 203. In an open state, light (or other electromagnetic waves) can enter the cavity of the housing 104 and the sensor 102 (e.g., a camera) via the entrance surface 203.

In some embodiments, a length 208 of the sensor housing 104 along the horizontal direction (e.g., parallel to the x-axis) can be from 5 mm to 20 cm. A width 210 of the sensor housing 104 along the vertical direction (e.g., parallel to the y-axis) can also be from 5 mm to 20 cm.

In various implementations, during a cleaning cycle, the controller 118 may be configured (e.g., programed) to move the wiping elements 106a/106b along predefined wiping paths. In some cases, the controller 118 may select and perform a specific cleaning cycle based at least in part on, a user input, a program, a sensor signal, and the like. In various implementations, the wiping elements can move along a horizontal direction parallel to a ground surface (e.g., parallel to the x-axis) or vertical direction perpendicular to the ground surface (e.g., parallel to the y-axis).

Figure 3C:
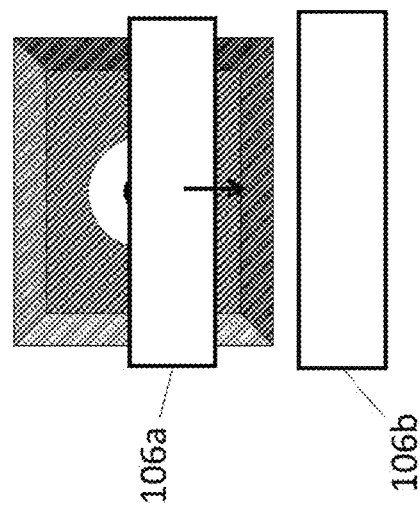
FIGS. 3A-3C are schematic diagrams illustrating a front view of the sensor cleaning system shown in FIG. 2A, having wimping elements that move in a vertical direction, when the bottom wiping element is moving toward the entrance surface (A), when the top wiping element is moving over the entrance surface of the sensor or sensor housing (B), and when the bottom wiping element is moving over the entrance surface (C).
Figure 3B:
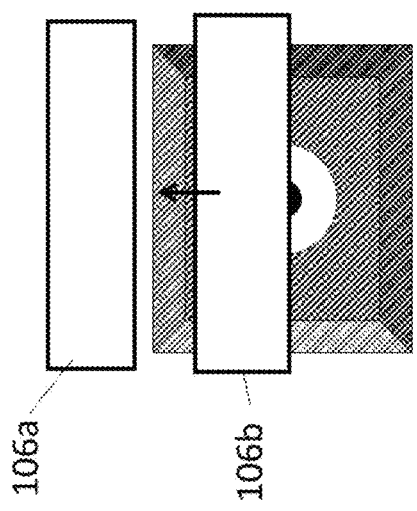
Figure 3A:
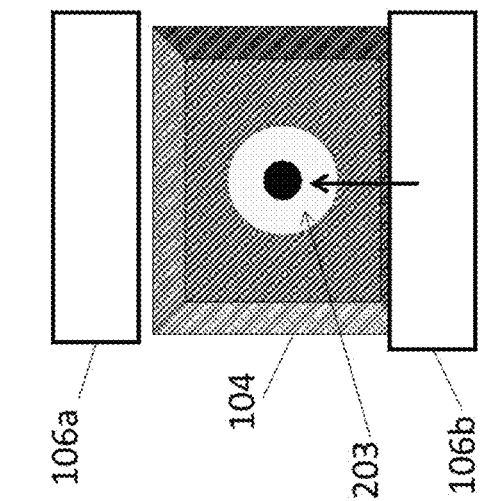

FIGS. 3A-3B are schematic diagrams illustrating three snap shots of a front view of the sensor cleaning system shown in FIG. 2A depicting positions of the wiping elements 106a/106b during a cleaning cycle that starts from the open state. In this example, the wiping elements are configured to move up and down along a vertical direction perpendicular to the ground surface. In FIGS. 3A and 3B, the bottom wiping element 106b moves up and goes over the entrance surface while the top wiping element 106a remains in its original position. In FIG. 3C the top wiping element 106a moves down and goes over the entrance surface while the bottom wiping element 106b remains in its original position.

FIGS. 4A-4C are schematic diagrams illustrating three snap shots of a front view of the sensor cleaning system depicting positions of the wiping elements 106a/106b during a cleaning cycle that starts from the open state. In some cases, the sensor cleaning system is similar to the sensor cleaning system shown in FIG. 2A, but it is mounted in a direction perpendicular to a mounting direction of the sensor cleaning system shown in FIG. 2A. In this example, the wiping elements are configured to move left and right along the horizontal direction parallel to the ground surface (parallel to the x-axis). In FIGS. 4A and 4B, the left wiping element 106a moves right and goes over the entrance surface while the right wiping element 106b remains in its original position. In FIG. 4C, the right wiping element 106b moves left and goes over the entrance surface while the left wiping element 106a remains in its original position.

Figure 5A:
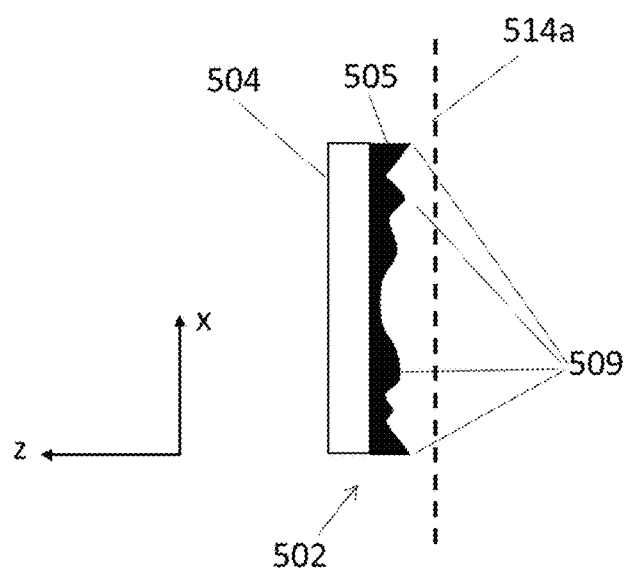
FIGS. 5A-5B are schematic diagrams illustrating a side view of two example wiping elements of a sensor cleaning system. (A) a wiping element with a wiping blade having a plurality of contact edges. (B) a wiping element with a wiping blade shaped based on a curvature of an entrance surface of the sensor or the sensor housing.
Figure 5B:
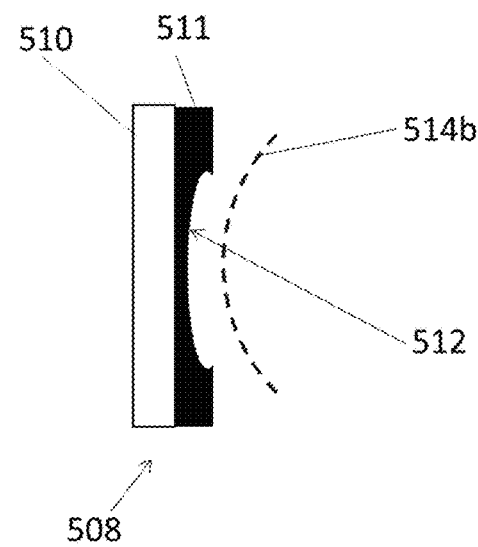

As described above a wiping element may comprise a wiping blade. The wiping blade may be coupled or connected to a sliding element that can move over an entrance surface. In some cases, the wiping blade may be removably connected to the sliding element. In some examples, the wiping blade may be integrated or attached to a wiping frame, and the wiping frame is removably coupled or connected to the sliding element. In some cases, the wiping blade may comprise a soft and/or flexible material while the wiping frame and/or the sliding element may be formed from a rigid material (e.g., metal, composite, or the like). FIGS. 5A-5B are schematic diagrams illustrating a side view of two example wiping elements 502, 508 that may be used in a sensor cleaning system. The wiping element 502 shown in FIG. 5A comprises a wiping frame (or sliding element) 504 and a wiping blade 505 having a plurality of contact edges 509. In some cases, the wiping blade 505 may be configured such that the contact edges 509 stay in touch with an entrance surface 514a at least during a portion of a cleaning cycle where the wiping element 502 moves over the entrance surface 514a.

The wiping element 508 shown in FIG. 5B comprises a wiping frame or sliding element 510 and a wiping blade 511 having a contact surface 512 shaped according to a shape of an entrance surface 514b cleaned or wiped by the wiping element 508. In some cases, the wiping blade 511 may be configured such that the contact surface 512 stays in touch with the entrance surface 514b at least during a portion of a cleaning cycle where the wiping element 508 moves over the entrance surface 514b. In some cases, the wiping blade 505 or 511 may be removed or disconnected from the wiping frame or sliding element 504 or 510. As such the wiping blade 505 or 511 may be replaceable. In some embodiments, the wiping blade 505 or 511 may be selected or replaced according to a shape or curvature of an entrance surface of a sensor or sensor housing cleaned and wiped by the sensor cleaning system.

In various examples, the entrance surfaces 514a and 514b may comprise portions of a window or lens disposed in an opening of the sensor housing 104 or connected to the sensor 102.

Figure 6:
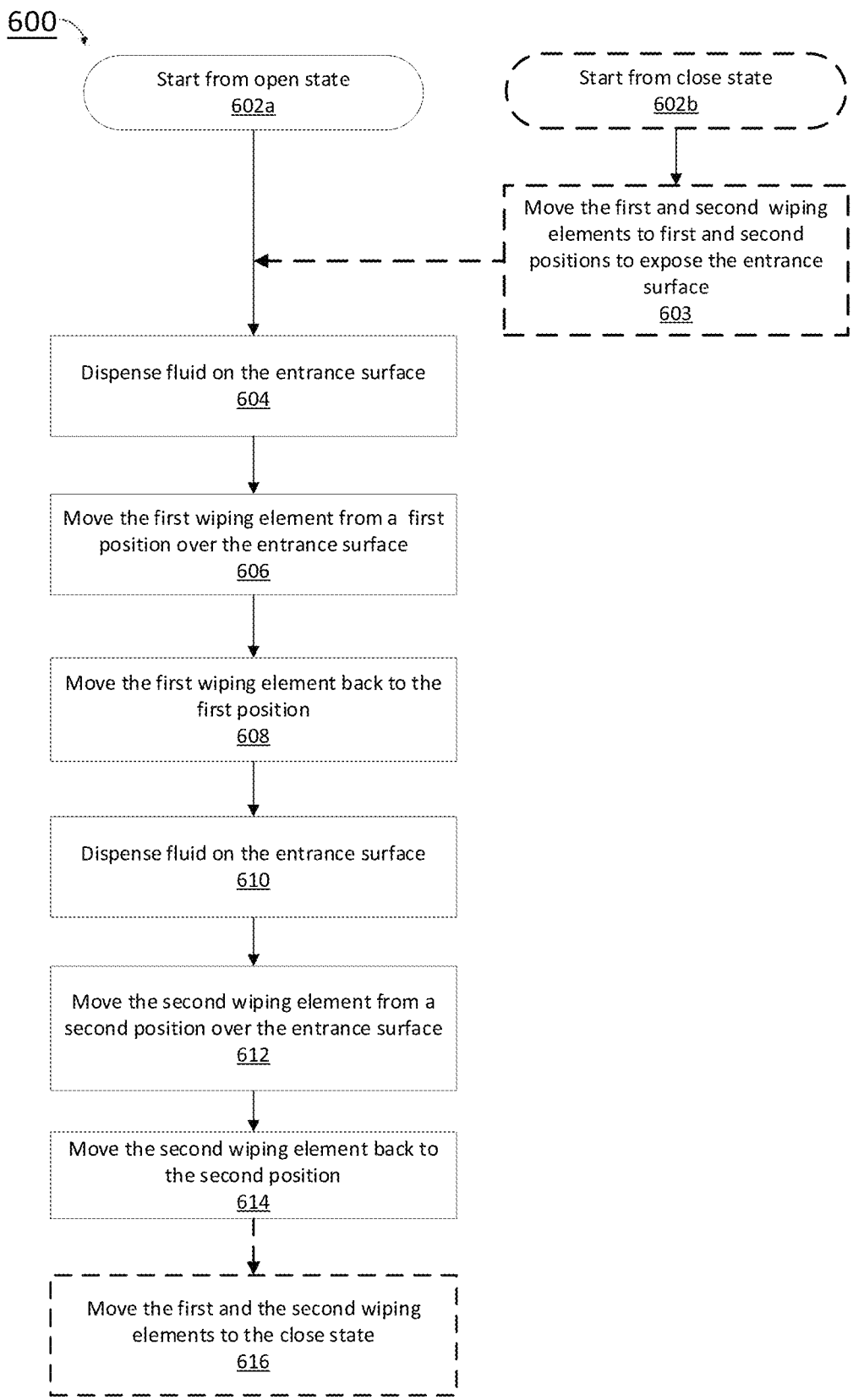
FIG. 6 is a flow diagram illustrating an example process for cleaning and wiping an entrance surface of a sensor or sensor housing using the cleaning system show in FIG. 2A.

FIG. 6 is a flow diagram illustrating an example process (or cleaning process) 600 for cleaning and wiping an entrance surface of sensor 102 or sensor housing 104 using the cleaning system 100 shown in FIGS. 1, 2A and 2B. In some cases, process 600 may comprise steps performed during a single cleaning cycle.

FIGS. 7A-7I are schematic diagrams illustrating sequential steps of a cleaning cycle performed by the sensor cleaning system shown in FIG. 2A, based on the process 600 shown in FIG. 6.

In some embodiments, the process 600 may be performed by the controller 118 using the motors 109a/109b, and the fluid pump 116. The controller 118 may comprise a hardware processor that executes machine readable instructions stored in a memory of the controller 118 and generates control signals that activate at least the motors 109a/109b and the fluid pump 116 according to instructions associated with the process 600. In some cases, the controller 118 may perform at least a portion of the process 600 based on signals received from the user interface 122, the environmental sensor 124, and/or a temperature sensor that measures the temperature of a washer fluid inside the fluid reservoir.

In various examples, the process 600 may be performed in the beginning, during, or at the end of an operational period of the sensor when the sensor actively receives and/or sends EM waves to monitor a scene or an environment (e.g., an environment surrounding a vehicle on which the sensor is mounted). Accordingly, controller 118 may begin the process 600 from block 602a from an open state (as shown in FIG. 2A), or from block 602b from a closed state (as shown in FIG. 2B).

For example, when the sensor 102 is not in use (e.g., when the vehicle is turned off), the wiping elements 106a/106b can be in the closed state and when the sensor is activated (e.g., when the vehicle starts), the controller 118 may begin the process 600 from block 602b. At block 603, the controller 118 may move the first and second wiping elements 106a/106b to first and second positions, respectively, to expose the entrance surface. Next the process may proceed to block 604 where the cleaning cycle begins. In some cases, e.g., when the wiping elements 106a/106b are configured to move along a vertical direction, the first position can be a top position above or at a top edge of the sensor housing 104, and the second position can be a bottom position below or at a bottom edge of the sensor housing 104 (as shown in FIG. 2A).

As another example, when the sensor 102 is in use (e.g., when the vehicle is moving), the first and second wiping elements 106a/106b can be already at the first and second positions, respectively, and the process 600 may begin at block 604.

At block 604, as shown in FIG. 7A, the controller 118 dispenses fluid (e.g., washer fluid) over the entrance surface via one or more washing elements (e.g., washing elements 108a/108b). In some cases, the controller 118 may send a control signal (e.g., an activation signal) to at least one fluid pump (e.g., fluid pump 116), causing the fluid pump to move fluid from at least one fluid reservoir (e.g., fluid reservoir 120) to the one or more washing elements (e.g., via one or more tubes connecting the fluid pump to the one or more washing elements).

At block 606, the controller 118 moves the first wiping element 106a from a first position over the entrance surface (FIG. 7B).

At block 608, the controller 118 moves the first wiping element 106a back to the first position (FIG. 7C).

At block 610, the controller 118 dispenses fluid (e.g., washer fluid) over the entrance surface via one or more washing elements (FIG. 7D).

Figures 7E, 7F, 7G, 7H, 7I:
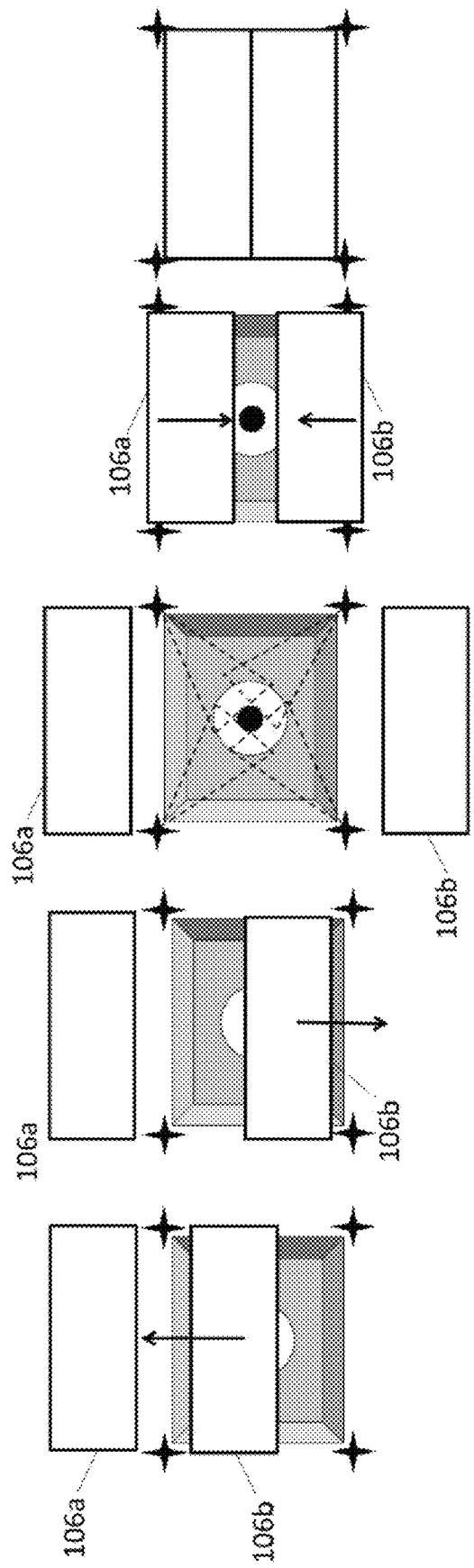

At block 612, the controller 118 moves the second wiping element 106b from a second position over the entrance surface (FIG. 7F).

At block 614, the controller 118 moves the second wiping element 106b back to the second position (FIG. 7G).

In some embodiments, one cleaning cycle may comprise performing the process 600, from block 604 to block 614, once. In some other embodiments, a cleaning cycle may comprise performing the process 600 two or more times. In these embodiments, after block 614 the process may go back to block 604 and the controller 118 may perform the steps in block 604 to block 614 one more time. In various implementations, the controller 118 may be programed to selectively initiate different cleaning cycles comprising different numbers of the process 600, based on a user selection via the user interface 122, a sensor signal received from the environmental sensor 124, or based on predefined conditions or schedules. For example, an initial cleaning cycle during vehicle startup process and an ending cleaning cycle after parking the vehicle or during a vehicle shutdown process may comprise performing the process 600 two or more times and a cleaning cycle during the operation of the sensor 102 may comprise performing the process 600 only once.

In some embodiments, the controller 118 may skip one or more blocks of the process 600 (e.g., block 610). In some cases, a cleaning cycle may be customized such that the controller 118 performs all blocks from block 604 to block 614 in a first process but skips one or more blocks in a second process of the cleaning cycle. Different combinations and variations are possible.

In some examples, when the process 600 or anther cleaning process ends, at block 614, the wiping elements may stay at the first and second positions leaving the entrance surface exposed to the environment so that the sensor operation can continue until the next cleaning cycle when the controller 118 performs the process 600 or another cleaning cycle.

In some examples, a cleaning cycle may be triggered by a user input via the user interface 122. For example, a driver of the vehicle or another person in the vehicle may initiate the next cleaning cycle by touching an icon or virtual bottom on a touchscreen display or push a button on a control panel of the vehicle, to initiate the cleaning cycle. In some examples a cleaning cycle may be triggered by a sensor signal received from the environmental sensor. For example, when the environmental sensor generates a signal indicating excessive humidity and/or rain, the controller 118 may automatically initiate a cleaning cycle (e.g., a cleaning cycle dedicated to rain and/or excessive humidity).

In some embodiments, the controller 118 may adjust the temperature of the washer fluid at block 604 and 610 based on one or more predefined temperatures in a cleaning program executed by the controller 118, based on a user input via the user interface 122, or a sensor signal received from the environmental sensor 124 (e.g., a temperature sensor, a humidity sensor, or the like). For example, when the environmental sensor generates a signal indicating that the temperature of the environment is below a threshold environmental temperature, the controller 118 may increase the temperature of the washer fluid above a threshold washer fluid temperature.

In some examples, when the process 600 or a cleaning cycle ends, at block 614, the process may proceed to block 616. At block 616, the controller 118 may move the first and second wiping elements 106a/106b over the entrance surface and terminate the process 600 in a closed state (FIG. 2B) where the wiping elements 106a/106b partially or completely cover the entrance surface. In some cases, the process 600 may end at block 616 when the car is parked or switched off. For example, the controller 118 may be programed or configured to perform a final cleaning cycle when the vehicle goes through a shutdown process, and the last process of the cleaning cycle may end at block 616 so that the entrance surface stays clean when the sensor is not in use.

It should be understood that the cleaning process 600 is a nonlimiting example and in various implementations, the controller 118 may perform different cleaning processes during a cleaning cycle. As such, a number of washing steps and wiping steps and their order, temporal and spatial patterns based on which the wiping elements move during a wiping step, temporal and spatial patterns based on which the washer fluid is dispensed during a washing step, the temperature of the washer fluid during a washing step, the end state of the wiping elements at the end of a process (e.g., open or closed) may change in different processes. Other parameters and feature may also be different for different processes.

A cleaning cycle may comprise one cleaning process or a plurality of cleaning processes performed in a predefined or dynamically controlled sequence. The plurality of cleaning processes can be identical or different cleaning processes. Different cleaning processes may be configured for cleaning the entrance surface, through which the EM waves (light beams) are received by a sensor (e.g., a camera), under different environmental conditions as indicated by one or more sensor signals (e.g., a sensor signal generated by the environmental sensor 124).

In some cases, a user may define a customized cleaning process or cycle using the user interface 122. The customized cleaning process or cycle may be stored in a memory of the controller 118 for future use. For example, a user may define a customized cleaning process that will be performed during a vehicle startup and/or shutdown process. Alternatively, the user may define a customized cleaning process or cycle for a specific environmental condition. Such customized cleaning process or cycle may be initiated manually (e.g., using the user interface 122) or automatically (e.g., based on a user defined threshold condition for a sensor signal received from the environmental sensor). For example, a user may define a cleaning process or cycle for deicing the entrance surface when the temperature of the environment (as indicated by the sensor signal) drops below 32 degrees Fahrenheit or another predetermined temperature, the controller 118 performs the cleaning process.

In various embodiments, parameters that can be tailored for a customized cleaning cycle or process can include: temporal and spatial patterns for the wiping elements (e.g., wiping elements 106a/106b) during a wiping step, temporal and spatial patterns for the washing elements during a washing step, temperature of the washer fluid during a washing step, the number and order of washing and wiping steps in a cleaning process, the number and types of cleaning processes in a cleaning cycle, and the like.

Different features and methods described above with respect to cleaning windows and entrance surfaces of EM sensors (e.g., cameras, lidars, radars, etc.), may be used to clean a sensitive (or sensing) surface of other types of the sensors that may be sensitive to contamination of such sensitive surface.

In some embodiments a sensor cleaning system may comprise one or more features described above with respect to a cleaning cycle and/or dispensing washer fluids (e.g., having multiple washing elements), but include only one wiping element. For example, the sensor cleaning system 100 may only include the wiping element 106a but otherwise have all functionalities described above with respect to the sensor cleaning system 100 and the cleaning process 600.

In some embodiments a sensor cleaning system may comprise one or more features described above with respect to a cleaning cycle and/or and wiping element (e.g., having at least two independently controlled wiping elements), but include only one washing element. For example, the sensor cleaning system 100 may include only one of the washing elements 108a-108d but otherwise have all functionalities described above with respect to the sensor cleaning system 100 and the cleaning process 600.

EXAMPLE EMBODIMENTS

Some additional nonlimiting examples of embodiments discussed above are provided below. These should not be read as limiting the breadth of the disclosure in any way.

Example 1. A sensor cleaning system comprising:
a sensor housing that houses a sensor and comprises an opening which allows electromagnetic radiation to be transmitted from an environment to a cavity of the sensor housing and reach a sensing element of the sensor via an entrance surface;
at least one wiping element coupled to the sensor housing and configured to wipe the entrance surface;
a first and a second washing element positioned to dispense a fluid on the entrance surface along a first direction and a second direction different from the first direction, the first and the second washing elements configured to receive the fluid from a fluid reservoir; and
a motor coupled to the at least one wiping element, the motor configured to move the at least one wiping element in response to a control signal received from a controller;
wherein the controller is configured to control the motor to activate the at least one wiping element and control a fluid pump to dispense the fluid through the first and the second washing elements, in a predetermined sequence; and wherein the fluid pump is in communication with the fluid reservoir and the first and the second washing elements.

Example 2. The sensor cleaning system of Example 1, wherein the sensing element is configured to receive the electromagnetic radiation from the environment and generate an electric signal.

Example 3. The sensor cleaning system of Example 1, wherein the sensor includes a lens, and a surface of the lens comprises the entrance surface.

Example 4. The sensor cleaning system of Example 1, wherein the entrance surface is a portion of a window disposed in the opening or a window of the sensor.

Example 5. The sensor cleaning system of Example 1, further comprising a third washing element that is in communication with the fluid pump, receives the fluid from the fluid reservoir, and is configured to dispense the fluid on the entrance surface along a third direction different from the first and the second directions.

Example 6. The sensor cleaning system of Example 5, further comprising a fourth washing element that is in communication with the fluid pump, receives the fluid from the fluid reservoir, and is configured to dispense the fluid on the entrance surface along a fourth direction different from the first, second, and fourth directions.

Example 7. The sensor cleaning system of Example 1, wherein the fluid is a heated fluid.

Example 8. The sensor cleaning system of Example 1, wherein the controller is configured to activate the at least one wiping element and dispense the fluid through the first and the second washing elements in the predetermined sequence, in response to a sensor signal received from an environmental sensor.

Example 9. The sensor cleaning system of Example 8, wherein the controller is further configured to control a temperature of the fluid in the fluid reservoir based at least in part on the sensor signal.

Example 10. The sensor cleaning system of Example 1, wherein the controller activates the at least one wiping element by sliding the at least one wiping element over the entrance surface.

Example 11. The sensor cleaning system of Example 10, wherein the at least one wiping element comprises a wiping blade configured to stay in contact with the entrance surface when the at least one wiping element slides over the entrance surface.

Example 12. The sensor cleaning system of Example 11, wherein at least a portion of the wiping blade is shaped according to a shape of the entrance surface.

Example 13. The sensor cleaning system of Example 11, wherein the at least one wiping element further comprises a sliding element and the wiping blade is removably attached to the sliding element.

Example 14. The sensor cleaning system of Example 1, further comprising a second wiping element configured to move in a direction opposite to a direction of motion of the at least one wiping element, at least in during a portion of the predetermined sequence.

Example 15. The sensor cleaning system of Example 1, further comprising a second wiping element configured, wherein at least during a portion of the predetermined sequence the at least one wiping element is static while the second wiping element moves over the entrance surface.

Example 16. The sensor cleaning system of Example 14, wherein the sensor is mounted on a vehicle.

Example 17. The sensor cleaning system of Example 16, wherein during a vehicle shutdown process the controller controls the motor to move the first and the second wiping elements to isolate the entrance surface from the environment.

Example 18. The sensor cleaning system of Example 16, wherein during a vehicle startup process the controller controls the motor to move the first and the second wiping elements away from the entrance surface to expose the entrance surface to the environment.

Example 19. The sensor cleaning system of Example 1, wherein the sensor comprises a camera and the electromagnetic radiation comprises visible light.

Example 20. The sensor cleaning system of Example 1, wherein the sensor comprises a lidar and the electromagnetic radiation comprises infrared light.

Example 21. The sensor cleaning system of Example 1, wherein the fluid comprises a washer fluid.

Example 22. The sensor cleaning system of Example 14, wherein the predetermined sequence comprises motion of the first wiping element along a first wiping path, and motion of the second wiping element along a second wiping path different from the first wiping path.

Example 23. The sensor cleaning system of Example 22, wherein at least a portion of the first wiping path and at least a portion of the second wiping path pass over the entrance surface.

Example 24. A sensor cleaning system comprising:

a sensor housing that houses a sensor and comprises an opening which allows electromagnetic radiation to be transmitted from an environment to a cavity of the sensor housing and reach a sensing element of the sensor via an entrance surface;

a first wiping element coupled to the sensor housing;

a second wiping element coupled to the sensor housing;

a motor coupled to the first and the second wiping element, the motor configured to move the first and the second wiping element in response to control signals received from a controller; and the controller configured to control the motor to move the first wiping element along a first wiping path and the second wiping element along a second wiping path in a predetermined sequence in response to a control signal received from a controller;

wherein the first wiping path different from the second wiping path.

Example 25. The sensor cleaning system of Example 24, wherein at least a portion of the first wiping path and at least a portion of the second wiping path pass over the entrance surface.

Example 26. The sensor cleaning system of Example 24, wherein the sensing element is configured to receive the electromagnetic radiation from the environment and generate an electric signal.

Example 27. The sensor cleaning system of Example 24, wherein the sensor comprises a camera and the electromagnetic radiation comprises visible light.

Example 28. The sensor cleaning system of Example 24, wherein the sensor comprises a lidar and the electromagnetic radiation comprises infrared light.

Example 29. The sensor cleaning system of Example 24, wherein the sensor includes a lens, and a surface of the lens comprises the entrance surface.

Example 30. The sensor cleaning system of Example 24, wherein the entrance surface is a portion of a window disposed in the opening or a window of the sensor.

Example 31. The sensor cleaning system of Example 24, wherein the predetermined sequence comprises a first step of moving the first wiping element along the first wiping path and a second step of moving second wiping element along the second wiping path.

Example 32. The sensor cleaning system of Example 1, wherein the sensor is mounted on a vehicle.

Example 33. The sensor cleaning system of Example 32, wherein during a vehicle shutdown process the controller controls the motor to move the first and the second wiping elements to isolate the entrance surface from the environment.

Example 34. The sensor cleaning system of Example 32, wherein during a vehicle startup process the controller controls the motor to move the first and the second wiping elements away from the entrance surface to expose the entrance to the environment.

Example 35. The sensor cleaning system of Example 24, wherein the first and second wiping paths are substantially parallel.

Example 36. The sensor cleaning system of Example 31, further comprising a dispensing system configured to dispense a fluid on the entrance surface along at least two different directions.

Example 37. The sensor cleaning system of Example 36, wherein the controller is configured to activate the dispensing system to dispense the fluid on the entrance surface before or after one or all of the first step and the second step.

Example 38. The sensor cleaning system of Example 36, wherein the fluid comprises a washer fluid.

Example 39. A method of cleaning an entrance surface through which electromagnetic radiation is received by a sensing element of a sensor from an environment, the method comprising, by a control system of a cleaning system:
   dispensing a fluid on an entrance surface via at least two washing elements and along at least two different directions;
   moving a first wiping element over the entrance surface from a first position along a first wiping path; and
   moving a second wiping element over the entrance surface from a second position along a second wiping path.

Example 40. The method of Example 39, further comprising dispensing a fluid over the entrance surface via the at least two washing elements and along two different directions, before moving the first and the second wiping elements over the entrance surface.

Example 41. The method of Example 39, wherein the sensing element is configured to receive the electromagnetic radiation from the environment and generate an electric signal.

Example 42. The method of Example 39, wherein the sensor comprises a camera and the electromagnetic radiation comprises visible light.

Example 43. The method of Example 39, wherein the sensor comprises a lidar and the electromagnetic radiation comprises infrared light.

Example 44. The method of Example 39, wherein the sensor includes a lens, and a surface of the lens comprises the entrance surface.

Example 45. The method of Example 39, wherein the entrance surface is portion of a window of a sensor cleaning system or the sensor.

Example 46. The method of Example 39, wherein the first and second wiping paths are parallel.

Example 47. The method of Example 40, where sliding the first wiping element over the entrance surface along the first wiping path comprises moving the first wiping element in a first direction and sliding the second wiping element over the entrance surface along the second wiping path comprises moving the second wiping element in a second direction opposite to the first direction.

Example 48. The method of Example 47, further comprising sliding the first wiping element back to the first position before sliding the second wiping element along the second wiping path.

Example 49. The method of Example 48, further comprising sliding the second wiping element back to the second position.

Example 50. The method of Example 49, further comprising dispensing a fluid over the entrance surface via the at least two washing elements and along two different directions, after sliding the first wiping element back to the first position and before sliding the second wiping element along the second wiping path.

Example 51. The method of Example 39, wherein the sensor is mounted on a vehicle.

Example 52. The method of Example 51, further comprising, in response to vehicle shutdown process, moving the first and the second wiping elements over the entrance surface to isolate the entrance surface from the environment.

Example 53. The method of Example 51, further comprising, in response to vehicle startup process, moving the first and the second wiping elements away from the entrance surface to expose the entrance surface to the environment.

Example 54. The method of Example 39, wherein the at least two washing elements comprise four washing elements and the at least two different directions comprise four different directions.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware. Further, the computing system may include, be implemented as part of, or communicate with an automated glucose system, an ambulatory medicament system, or an ambulatory medical device.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Many variations and modifications may be made to the above-described embodiments, the elements of which are to be understood as being among other acceptable examples. All such modifications and variations are intended to be included herein within the scope of this disclosure.

What is claimed is:

1. A method of cleaning an entrance surface through which electromagnetic radiation is received by a sensing element of a sensor of a vehicle from an environment, the method comprising, by a control system of a cleaning system:
   dispensing a fluid on the entrance surface via at least two washing elements and along at least two different directions;
   moving a first wiping element over the entrance surface from a first position along a first wiping path; and
   moving a second wiping element over the entrance surface from a second position along a second wiping path, wherein the first wiping path is different from the second wiping path, and
   moving the first wiping element and the second wiping element toward each other until reaching a closed state in which the first wiping element and the second wiping element are in contact with each other and cover the entrance surface to block the entrance surface from environmental contamination.

2. The method of claim 1, further comprising dispensing the fluid over the entrance surface via the at least two washing elements and along two different directions, before moving the first and second wiping elements over the entrance surface.

3. The method of claim 1, wherein the sensor comprises a camera, wherein the electromagnetic radiation comprises visible light, and wherein the sensing element is configured to receive the visible light from the environment and generate an electric signal.

4. The method of claim 1, further comprising automatically moving the first wiping element and the second wiping element to the closed state during a vehicle startup process.

5. The method of claim 2, wherein moving the first wiping element over the entrance surface along the first wiping path comprises moving the first wiping element in a first direction and moving the second wiping element over the entrance surface along the second wiping path comprises moving the second wiping element in a second direction opposite to the first direction.

6. The method of claim 4, further comprising automatically moving the first wiping element and the second wiping element away from each other from the closed state to an open state to expose the entrance surface during a vehicle startup process.

7. The method of claim 5, further comprising sliding the first wiping element back to the first position before sliding the second wiping element along the second wiping path.

8. The method of claim 6, wherein the first and second wiping paths are substantially parallel.

9. The method of claim 6, further comprising controlling a heating element to heat the fluid.

10. The method of claim 6, wherein dispensing the fluid on the entrance surface via the at least two washing elements and along the at least two different directions comprises dispensing the fluid on the entrance surface via four washing elements and along four different directions.

11. The method of claim 7, further comprising dispensing the fluid over the entrance surface via the at least two washing elements and along the two different directions, after sliding the first wiping element back to the first position and before sliding the second wiping element along the second wiping path.

12. The method of claim 10, wherein the four washing elements are disposed at four corners of a housing of the sensor.

\* \* \* \* \*